United States Patent [19]

Hausmann

[11] Patent Number: 5,252,649
[45] Date of Patent: Oct. 12, 1993

[54] PNEUMATIC TIRE WITH TREAD CONTAINING PLASTICIZER, PLASTICIZER MIXTURE FOR PNEUMATIC TIRE, AND METHOD OF PRODUCING SUCH PLASTICIZER MIXTURE

[75] Inventor: Bernadette Hausmann, Puchberg, Austria

[73] Assignee: Semperit Reifen AG, Traisckirchen, Austria

[21] Appl. No.: 912,681

[22] Filed: Jul. 13, 1992

[30] Foreign Application Priority Data

Jul. 18, 1991 [AT]  Austria .................................. 1441/91

[51] Int. Cl.$^5$ ................................................ C08K 5/10
[52] U.S. Cl. .................................... 524/313; 524/482; 524/485; 524/486
[58] Field of Search ............... 524/313, 481, 482, 483, 524/484, 485, 486, 848

[56] References Cited

U.S. PATENT DOCUMENTS

4,567,928  2/1986  Takiguchi ..................... 152/209 R

FOREIGN PATENT DOCUMENTS

3417166  2/1985  Fed. Rep. of Germany .
63-39935  2/1988  Japan .
1-221441  9/1989  Japan .
2-092940  4/1990  Japan .
2140447  11/1984  United Kingdom .

OTHER PUBLICATIONS

Chemical Abstracts, vol. 113, No. 16, Columbus, Ohio, Abstract No. 133987a, T. Okita et al. "Low Temperature Softening Agents for Rubbers".
J. V. Del Gatto and S. R. Hague, "Materials and Compounding Ingredients for Rubber", 1970 Rubber Automotive Publications, New York, pp. 162 and 192.
Ullman's Encyclopedia of Industrial Chemistry, vol. A 10.
W. Gnorich, et al. The Friction of Polymers on Ice*.
A. Ahagon et al. Friction on Ice*.
H. W. Kummer et al. Concept and Use of the British Portable Skid Resistance Tester.
DIN 53 505.
Database WPIL, Derwent (C) No. 88-088469.

*Primary Examiner*—Paul R. Michl
*Assistant Examiner*—Edward Cain
*Attorney, Agent, or Firm*—Sandler, Greenblum & Bernstein

[57] ABSTRACT

The plasticizer constituent in the rubber mixture of the tread member of a pneumatic vehicle tire contains at least partially at least one fatty acid triglyceride, preferably natural rape seed oil in which more than 50% of the fatty acid residues are present as oleic acid residues and an oleic acid/linoleic acid ratio is greater than or equal to 2:1. Sunflower seed oil or natural rape seed oil and triglyceride of oleic acid also can be used as the fatty acid triglycerides. There is thus achieved improved traction upon ice and snow as well as at dry and wet roads in the absence of negative effects on other properties of the tire.

22 Claims, No Drawings

PNEUMATIC TIRE WITH TREAD CONTAINING PLASTICIZER, PLASTICIZER MIXTURE FOR PNEUMATIC TIRE, AND METHOD OF PRODUCING SUCH PLASTICIZER MIXTURE

CROSS REFERENCE TO RELATED APPLICATION

This application is related to the Austrian Application Serial No. A 1441/91, filed at the Austrian Patent Office on Jul. 18, 1991, to which reference may be had and the disclosure of which is incorporated herein in its entirety by reference.

BACKGROUND OF THE INVENTION

The present invention relates to a new and improved pneumatic vehicle tire having a strand-like tread member or tread surface comprising a rubber mixture which contains a predetermined proportion of plasticizer.

The present invention also relates to a new and improved plasticizer mixture for use in a tread member rubber mixture of a pneumatic vehicle tire as well as to a novel method of preparing such plasticizer mixture.

In the construction of tires, a predominant effort is expended in improving to the greatest extent possible the tire travelling characteristics or properties independent of the effects of the environment and climatic conditions. In particular, it is intended to positively affect criteria tire characteristics, such as gripping force, skid resistance, rolling resistance and the like, which are essential in this connection, by correspondingly further developing the tire profile and, above all, also the tread member rubber mixture or compound.

Polymers having low glass transition temperature like natural rubber (NR) and cis-polybutadiene rubber (BR) are known to provide good traction on snow and ice; see the article entitled "The Friction of Polymers on Ice", authored by W. Gnörich and K. A. Grosch, appearing in the Journal of The Institution of the Rubber Industry 6, 192–196 (1972). However, in such blends or formulations the wet tire adherence or traction is unsatisfactory.

Starting from these conventional tread member rubber mixtures or compounds and in order to improve upon their property balance under ice, snow, dry and wet conditions, the materials of the tread surface have been further developed by selecting polymers and polymer blends having higher damping and, therefore, positive effects on wet traction or adherence, on the one hand, and by using plasticizers which reduce hardening of the rubber at low temperatures, on the other hand. Since usually the winter and wet travelling properties work in opposition to each other, polymers which improve the wet traction, however, simultaneously will result in a deterioration in snow and ice traction in most cases. The addition of cold condition plasticizers (see the paper of Asahiro Ahagon et al., entitled "Friction on Ice", presented at the meeting of the Rubber Division, American Chemical Society, 131st Meeting, Montreal, Quebec, Canada, May 26–29, 1987), such as naphthenic or paraffinic mineral oil plasticizers or ester plasticizing agents, while improving upon the winter properties, simultaneously result in deteriorated wet traction.

According to another prior art proposal, it is contended that, by conjointly adding butyl rubber and ester plasticizing agents, the gripping force, which is effective on snow and ice, is improved without reducing the gripping force on wet roads, see, for example, German Patent No. 3,417,166, granted Feb. 28, 1985. However, disadvantages thereof reside in a deterioration of the properties on dry roads as well as an increased crack sensitivity, which is caused by the incompatibility of the aforementioned rubbers and butyl rubber, and the high price of the mentioned materials, namely the butyl rubber and the ester compounds. Also, the mixing process tends to be difficult due to the aforementioned incompatibility because inhomogeneities become unavoidable.

OBJECTS OF THE INVENTION

It is a primary object of the present invention to construct a tire of the initially mentioned type in a manner such that the drawbacks and limitations of the prior art tires and rubber mixtures are avoided.

A further important object of the present invention resides in producing a tire or rubber mixture which has improved traction on ice and snow as well as on dry and wet roads in comparison to prior art tires and rubber mixtures.

It is also another significant object of the present invention to provide a tire or rubber mixture of the initially mentioned type which has the aforementioned improved traction properties but does not negatively affect other important tire properties like wear and rolling resistance.

A still further notable object of the present invention is directed to providing a simple and useful method of producing a tread member rubber mixture having the aforenoted improved travelling properties.

DESCRIPTION OF THE INVENTION

Now in order to achieve these and still further objects of the present invention, which will become more readily apparent as the description proceeds, the present development is manifested, among other things, by the features that the rubber mixture of the tire tread member contains a proportion of plasticizer which at least partially comprises fatty acid triglycerides, or stated in a somewhat different way, at least one fatty acid triglyceride. In comparison with other cold condition plasticizers, such as synthetic ester plasticizers, mineral oil derivatives and the like, it has been surprisingly found that already low dosages of the aforementioned fatty acid triglycerides cause a significant reduction in the rigidity (Shore hardness, dynamic storing modulus E') at low temperatures (below 0° C.) but do not lower, for example, skid resistance (British Pendulum Skid Tester, herein briefly sometimes referred to as "BPST"). When carrying out tire tests, there has been found an improvement in all disciplines. Above all, the winter properties such as traction on snow as well as ice adherence or traction are markedly increased in accordance with the present invention. Furthermore, the tire traction or adherence level at wet roads is significantly increased in the tire of the inventive construction as compared to conventional tires, and there were simultaneously observed good travelling properties at reduced rolling resistance.

According to a preferred embodiment of the present invention, it is contemplated that more than 50% of the fatty acid residues in the fatty acid triglycerides comprise oleic acid. There is also preferably present a constituent or proportion of linoleic acid and the oleic acid/linoleic acid ratio is greater than or at least equal to 2:1. The best results were obtained when using such fatty acid spectrum.

In the last-mentioned connection, what is particularly preferred according to a further development of the invention is that the proportion of triglycerides at least partially is made up of rape seed oil. Best results were obtained, for example, using crude, dehydrated rape seed oil commercially available from the Austrian firm styled as Ölmühle Company, located at Bruck/Leitha, Austria, in which more than 53% of the fatty acid residues is present as oleic acid residue and the oleic acid/linoleic acid ratio is 2:1 in the presence of small amounts of erucic acid. Furthermore, rape seed oil is generally recognized as safe from a toxicological point of view, is compatible with the environment and has a favorable price, so that no disadvantages have to be taken into account in these respects for achieving the aforementioned improvement in tire properties.

According to a preferred further embodiment of the invention, the proportion of rape seed oil in the tread member rubber mixture is 2 to 35 parts by weight per 100 parts by weight of the tread member rubber mixture and particularly preferred is an amount of 4 to 8 parts by weight per 100 parts by weight of the tread member rubber mixture. Even such small amounts, which practically do not have any effect at all upon the other properties of the tread member rubber mixture, show considerable effectiveness with regard to the previously explained improvements in the tire properties.

According to a still further development of the present invention, the remaining proportion of the plasticizer is selected from the group consisting of mineral oil plasticizers, paraffinic oil, naphthenic oil, aromatic oil or a mixture of two or more of these compounds. Using these admixtures which are known as such, the properties of the rubber mixture can be further affected or improved for different purposes.

The rubber mixture as such, which contains the rape seed oil, may additionally contain at least one polymer selected from the group consisting of natural rubber (NR), poly isoprene rubber, cis- or vinyl-polybutadiene rubber, styrene butadiene rubber (SBR) or mixtures thereof; also, additions of butyl rubber, halobutyl rubber, or 3,4-IR (3,4-isoprene rubber) are possible. Furthermore, and without any restrictions, the usual amounts of fillers, aging protectors, vulcanization chemicals, zinc oxide, stearic acid, processing adjuvants and the like can be provided.

In a plasticizer mixture of the initially mentioned type, in accordance with the present invention it is contemplated that there are present fatty acid triglycerides, wherein preferably more than 50% of the fatty acid residues is made up of oleic acid residues. It is preferred that therein in the additional presence of linoleic acid, the oleic acid/linoleic acid ratio is greater than or equal to 2:1. This plasticizer mixture can be directly used for producing the inventive vehicle tire constructed in accordance with the explanations given hereinabove. In particular, it is further contemplated in this connection that the proportion of triglyceride at least partially is made up of a rape seed oil rubber mixture containing rape seed oil in the amount of 2 to 35 parts by weight, preferably 4 to 8 parts by weight, per 100 parts by weight of the tread member rubber mixture.

The remaining plasticizer proportion of such plasticizer mixture, in accordance with the present invention, may comprise mineral oil plasticizers, paraffinic oil, naphthenic oil, aromatic oil or a mixture of two or more of these compounds.

Still further, the plasticizer mixture may contain natural rape seed oil in conjunction with triglyceride of oleic acid. Also, such plasticizer mixture can comprise sunflower seed oil. Such sunflower seed oil likewise can be obtained from the aforementioned Austrian firm Ölmühle Company, located at Bruck/Leitha Austria.

Further features and advantages of the inventive plasticizer mixtures have already been mentioned in connection with the corresponding features and advantages of the initially discussed tire constructions.

The inventive method of preparing the above-mentioned plasticizer mixture is characterized, among other things, by the features that the at least one fatty acid triglyceride constituent or proportion is added to a rubber mixture which, if desired, additionally may contain carbon black and/or further plasticizers in order to produce the plasticizer mixture. When using an emulsion styrene butadiene rubber for producing the inventive plasticizer mixture, this method is further developed in accordance with the invention such that the at least one fatty acid triglyceride, if desired, conjointly with carbon black and/or other plasticizers, is admixed to the styrene butadiene rubber latex prior to coagulation thereof.

In the accompanying Table 1 there are set forth some examples which show that the aforedescribed effect of lowering the low temperature rigidity markedly occurs independent of the polymer or rubber mixture system which is used. From the examples, many of which relate to the use of rape seed oil of the type described hereinbefore, it will also be evident that already small amounts of rape seed oil show high effectiveness. Thus, for instance, Example no. 2 containing 5 parts by weight of rape seed oil per 100 parts by weight of rubber mixture has a decrease in $E'$ of about 40% at $-40°$ C. in comparison with the rubber mixture in the absence of rape seed oil.

The carried-out tire tests, see Table 2, have shown an improvement in all disciplines due to the aforedescribed measure of partially substituting plasticizer by rape seed oil. Above all, there is a significant increase in the winter properties, such as traction capability on snow as well as ice adherence or traction due to the rape seed oil employment; also, the traction or adherence level at wet roads is greater when using the rape seed oil containing rubber mixture and, simultaneously, the travelling behavior is satisfactory and the rolling resistance is lowered.

Explanation With Respect to Table 2

Examples 1 and 2 as set forth in Table 1

Tire tests

Test strands having the dimension 195/65 R 15 have been tested using tread member strands of the herein described rubber mixture compositions in the presence and in the absence of rape seed oil with respect to the disciplines given hereinafter; all data are given in the form of index values, i.e. the respective property is increasingly improved with increasing index values.

Traction on Snow

The longitudinal acceleration of a test vehicle on a snow road was plotted against the slip measured between the driving and rolling axes. The average height of the acceleration-slip curve represents the traction capability of the tire on snow.

Braking on Ice

Skid braking distances until complete vehicle standstill were measured starting at a speed of 20 km/hr in a hall provided with an artificial ice surface at an ice temperature of $-5°$ C. and an environmental temperature of $+5°$ C.

Braking on a Wet Road

Skid braking distances until vehicle standstill were measured by braking at a starting speed of 60 km/hr on a rough, wet asphalt surface.

Circle Travel on Wet Surface

The time required for driving through one lap on a rough asphalt track at maximum speed was averaged over 10 laps. The circle had a radius of 50 meters.

Rolling Resistance

The measurements were carried out using a steel drum and measuring the required driving power at speeds in the range of 60 km/hr to 150 km/hr under conditions between a fully loaded tire and a tire in only slight contact.

Travelling Behavior on Dry Road

The test was carried out using a high-speed track having a length of several kilometers. The travelling behavior was subjectively judged and stated as an index number.

Shore A Hardness

The test was carried out in accordance with DIN (German Industrial Standard) 53505, however, using a cold chamber at sample and air temperatures of $-10°$ C.

Dynamic Storing Modulus E'

This property was measured using the "Eplexor" instrument of the company Gaddum at a frequency of 10 Hz, a constant force, a static tension of 0.64 MPa, and a dynamic tension of $\pm 0.38$ MPa, using cylindrical test bodies having a diameter of 10 mm. and a height of 10 mm.

BPST:

Skid measurements were carried out utilizing a British Portable Skid Tester.

As will be apparent from the prior description, in the following Table 1 reference character SH signifies Shore hardness, the reference character E' represents dynamic storing modulus E', and BPST means British Portable Skid Tester. Also, in this Table the numerical values given for all of the constituents of the plasticizer mixture relate to parts by weight.

TABLE 1

| | Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| NR[1] | 60 | 60 | 70 | 70 | 70 | 70 | 40 | 40 | | | 70 | |
| BR[2] | | | | | 30 | 30 | 20 | 20 | 30 | 30 | | 30 |
| SBR[3] | 40 | 40 | 30 | 30 | | | 40 | 40 | 70 | 70 | 30 | 70 |
| Activated Carbon Black | 70 | 70 | 70 | 70 | 75 | 75 | 72 | 72 | 80 | 80 | 70 | 80 |
| PLASTIZICER | | | | | | | | | | | | |
| Mineral Oil Aromatic | 40 | 35 | 20 | 20 | 45 | 37 | 33 | 28 | 50 | 45 | 20 | 45 |
| Mineral Oil Naphthenic | | | 15 | | | | | | | | | |
| Rape Seed Oil[4] | | 5 | | 15 | | 8 | | 5 | | 5 | 10 | |
| Sunflower Seed Oil | | | | | | | | | | | | 5 |
| Triglyceride of Oleic Acid | | | | | | | | | | | 5 | |
| 6PPD[5] | 2 | | | | | | | | | | | |
| Special Wax[6] | 1 | | | | | | | | | | | |
| Stearic Acid | 2.5 | 2.5 | 2.5 | 2.5 | 2.5 | 2.5 | 2.5 | 2.5 | 2.5 | 2.5 | 2.5 | 2.5 |
| ZnO | 3 | 3 | 3 | 3 | 3 | 3 | 3 | 3 | 3 | 3 | 3 | 3 |
| Sulfene Amide Accelerator[7] | 2 | 2 | 1.5 | 1.5 | 2.5 | 2.5 | 1.2 | 1.2 | 1.8 | 1.8 | 1.5 | 1.8 |
| Sulfur | 3 | 3 | 1.8 | 1.8 | 1.8 | 1.8 | 2 | 2 | 2.4 | 2.4 | 1.8 | 2.4 |
| SH-10° C. (Scale Divisions) | 76 | 72 | 64 | 61 | 65 | 62 | 77 | 75 | 74 | 70.7 | 61.5 | 70 |
| E'-10° C. | 35.7 | 20.9 | 10.2 | 8.5 | 11.6 | 9.5 | 39.5 | 29.8 | 32.9 | 21.2 | 8 | 20.5 |
| E'-20° C. | 74.9 | 39.5 | 14.6 | 11.6 | 21.1 | 16 | 70.1 | 54.4 | 56.7 | 34.2 | 11.2 | 33.8 |
| E'-40° C. | 405.1 | 236 | 52 | 36.6 | 120.7 | 79.2 | 165.1 | 142.7 | 139.8 | 83.7 | 37 | 81.2 |
| BPST | 49 | 50.1 | 45.5 | 46 | 49 | 49.5 | 50.2 | 50.5 | 47.2 | 47 | 46.2 | 46.5 |

The footnote references used in the preceding Table 1 are now explained below:
[1] Standard sheet 3, crude, mechanically degraded;
[2] BR: a polybutadiene polymer of high purity and light color and an ML/4 at 212° F. between 30 and 40 Mooney units, having a specific gravity of about 0.90 at 25° C. and a refractive index of 1.5167;
[3] SBR: non-staining emulsion SBR is a cold, mixed soap polymer containing between 23% and 26% bound styrene, having an ML/4 of between 46 and 58 at 212° F., a maximum ash content of 1.50% and a specific gravity of about 0.94 at 25° C.;
[4] Triglyceride mixture; mainly containing oleic acid and linoleic acid, manufactured by pressing or extracting rape seed and beet seed;
[5] 6-Dodecyl-1,2-dihydro-2,2,4-trimethylquinoline;
[6] Microcrystalline wax, mixture of n-paraffins and isoparaffins; and
[7] Benzothiazyl-2-tert.-butylsulfene amide (accelerator).

TABLE 2

| | Examples | |
|---|---|---|
| Tire Test (195/65 R15) | 1 | 2 |
| Traction on snow | 100 | 113 |
| Braking force on ice | 100 | 109 |
| Braking force on wet road | 100 | 105 |

TABLE 2-continued

| Tire Test (195/65 R15) | Examples | |
|---|---|---|
| | 1 | 2 |
| Swing on wet road | 100 | 104 |
| Travelling behavior on dry road | 100 | 102 |
| Rolling resistance | 100 | 103 |

While there have been described present preferred embodiments of the invention, it is distinctly to be understood the invention is not limited thereto, but may be otherwise variously embodied and practiced within the scope of the following claims.

What I claim is:

1. A pneumatic vehicle tire comprising:
   a tread member comprising a tread member rubber mixture including a plasticizer;
   said plasticizer comprising at least one fatty acid triglyceride; and
   said fatty acid triglyceride comprising oleic acid in a amount of more than 50% of the total fatty acids.

2. The tire as defined in claim 1, wherein said fatty acid triglyceride further comprises linoleic acid and said oleic acid and said linoleic acid are present in a ration of at least 2:1.

3. The tire as defined in claim 1, wherein said at least one fatty acid triglyceride comprises rape seed oil 4. The tire as defined in claim 3, wherein said rape seed oil is present in an amount in the range of 2 to 35 part by weight per 100 parts by weight of said trade member rubber mixture.

5. The tire as defined in claim 4, wherein said rape seed oil is present in an amount in the range of 4 to 8 parts by weight per 100 parts by weight of said tread member rubber mixture.

6. The tire as defined in claim 1, wherein said at least one fatty acid triglyceride comprises rape seed oil and triglyceride of oleic acid.

7. The tire as defined in claim 1, wherein said plasticizer further comprises a constituent selected form the group consisting of mineral oil plasticizer, paraffinic oil, naphthenic oil, aromatic oil, and a mixtures thereof.

8. A plasticizer mixture for use in a tread member rubber mixture of a pneumatic vehicle tire, comprising:
   at least one fatty acid triglyceride comprising oleic acid in an amount of more than 50% of the total fatty acids and a constituent selected from the group consisting of mineral oil plasticizer, paraffinic oil, naphthenic oil, aromatic oil, and mixtures thereof.

9. The plasticizer mixture as defined in claim 8, wherein said fatty acid triglyceride further comprises linoleic acid and said oleic acid and said linoleic acid are present in a ratio of at least 2:1.

10. The plasticizer mixture as defined in claim 8, wherein said at least one fatty acid triglyceride comprises rape seed oil.

11. The plasticizer mixture as defined in claim 8, wherein said at lest one fatty acid triglyceride comprises rape seed oil and triglyceride of oleic acid.

12. A method of preparing a plasticizer mixture for use in a tread member rubber mixture for a pneumatic vehicle tire, comprising the steps of:
   providing a tread member rubber mixture; and
   mixing said tread member rubber mixture with at least one fatty acid triglyceride comprising oleic acid in an amount of more than 50% of the total fatty acids.

13. The method as defined in claim 12, wherein said tread member rubber mixture comprises carbon black.

14. The method as defined in claim 12, further including the step of adding further plasticizer.

15. The method as defined in claim 12, wherein said at least one fatty acid triglyceride comprises rape seed oil.

16. The method as defined in claim 12, wherein said tread member rubber mixture comprises a styrene butadiene rubber latex for producing an emulsion styrene butadiene rubber, and said step of mixing said tread member rubber mixture and said at lest one fatty acid triglyceride comprises admixing said at least one fatty acid triglyceride with said styrene butadiene rubber latex prior to coagulation.

17. The method as defined in claim 16, further comprising, admixing carbon black with said styrene butadiene rubber latex and with said at least one fatty acid triglyceride.

18. The method as defined in claim 16, further comprising, admixing further plasticizer with said styrene butadiene rubber latex.

19. The method as defined in claim 12, wherein said at least one fatty acid triglyceride comprises rape seed oil and triglyceride of oleic acid.

20. The method as defined in claim 12, wherein said fatty acid triglyceride further comprises linoleic acid residues and said oleic acid and said linoleic acid are present in a ratio of at least 2:1.

21. The method as defined in claim 15, wherein said rape seed oil is present in an amount in the range of 2 to 25 parts by weight per 100 parts by weight of said tread member rubber mixture.

22. The method as defined in claim 21, wherein said rape seed oil is present in an amount in the range of 4 to 8 parts by weight per 100 parts by wight of said tread member rubber mixture.

* * * * *